United States Patent [19]
Huntington et al.

[11] Patent Number: 5,686,122
[45] Date of Patent: Nov. 11, 1997

[54] MODULAR MOLD COOLING SYSTEM

[75] Inventors: Christopher Hayes Huntington, Everett; Douglas Tom Gardham, Alliston, both of Canada

[73] Assignee: Husky Injection Molding Systems Ltd., Bolton, Canada

[21] Appl. No.: 560,433

[22] Filed: Nov. 17, 1995

[51] Int. Cl.$^6$ ................................................. B29C 35/00
[52] U.S. Cl. ........................... 425/548; 425/547; 425/552; 425/DIG. 9
[58] Field of Search ..................................... 425/552, 406, 425/407, 445, DIG. 9, 547, 548; 164/348, 443; 249/111; 165/DIG. 395, DIG. 396, DIG. 397, DIG. 361; 285/219; 72/316; 137/340, 334

[56] References Cited

U.S. PATENT DOCUMENTS

| | | | |
|---|---|---|---|
| 1,571,068 | 1/1926 | Stancliffe | 165/DIG. 395 |
| 2,479,191 | 8/1949 | Williams et al. | 164/348 |
| 2,770,011 | 11/1956 | Kelly | 249/111 |
| 3,381,743 | 5/1968 | Bode | 164/443 |
| 4,408,981 | 10/1983 | Brown | |
| 5,052,915 | 10/1991 | Schad et al. | |

Primary Examiner—Jay H. Woo
Assistant Examiner—Robert Hopkins
Attorney, Agent, or Firm—Bachman & LaPointe, P.C.

[57] ABSTRACT

The present invention relates to a modular fluid distribution block having particular utility in a cooling system for the mold of an injection molding machine. The fluid distribution block of the present invention is characterized by a housing having a plurality of ports in fluid communication with each other and a plurality of feet. The feet have three orthogonally arranged bores machined therein to allow the fluid distribution block to be connected to another fluid distribution block, a plate for closing off a port and/or a fitting for allowing the fluid distribution block to be connected to another component such as a flexible hose. The fluid distribution block is preferably formed from a corrosive resistant material to avoid the problem of scaling. The manner in which the fluid distribution block is incorporated into a system for providing a mold with cooling fluid is also described.

20 Claims, 5 Drawing Sheets

MODULAR MOLD COOLING SYSTEM

BACKGROUND OF THE INVENTION

The present invention relates to an improved system for distributing service fluids to a machine, such as an injection molding machine and, in particular, to a novel modular fluid distribution block used in said machine.

The injection molding of plastic requires that the heat of the melted plastic be removed as quickly as possible from the molding surfaces. In order to accomplish this, a substantial amount of water needs to be pumped through channels in the stationary and moving mold halves forming the mold. The supply of this cooling water on many injection molding machines is done in a haphazard manner, usually as an afterthought. The traditional way to accomplish this is to hard pipe the water conduits from a hook up point outside the machine (generally on the non-operator side) to a manifold(s) on the moving platen and the stationary platen. This needs to be done carefully since there is generally little room between the machine frame and the guarding. It must also be done so that it does not interfere with the platen movement.

FIGS. 1a and 1b herein show a conventional approach for supplying a cooling fluid to an injection molding machine 10 having a stationary platen 12 and a movable platen 14. As can be seen from these Figures, the coolant supply system includes fluid delivery and return lines 16 and 18 respectively formed from cast iron fittings, such as elbows 20, and steel pipes 22. The steel pipes used in the system must be cut to length, threaded and assembled with cast iron tapered threaded fittings. To fabricate this system, careful measuring, fabrication and assembly to ensure proper location and orientation of each component are required. After the system is assembled, it appears in many instances that the threaded connections do not always "seat" in the proper orientation and are often over torqued in order to make them fit. Still further, the entire assembly must be carefully bracketed to keep it in place. Since the pipes 22 carry cooling water, it is often necessary to insulate them to prevent them from "sweating". The water flowing through the pipes also causes corrosion of the metal. The resulting scale often comes loose and is carried to the mold where intricate passages can become blocked. Although internally coated pipe and fittings can be used, they are substantially more expensive.

A system such as that shown in FIGS. 1a and 1b requires approximately 50 pipe connections to complete. The time required to assemble and install piping without manifolds is approximately 24 hours. The cost of materials for such an installation is approximately $5,300.

Still another problem that must be dealt with is the difficulties in changing a system such as that in FIGS. 1a and 1b. For example, making a change in the routing of the system is extremely difficult as it requires the disassembly of a substantial portion of the system and the replacement of many components.

SUMMARY OF THE INVENTION

Accordingly, it is an object of the present invention to provide a modular cooling system for an injection molding machine which is easy to fabricate and install.

It is a further object of the present invention to provide a cooling system as above which utilizes a novel modular fluid distribution block.

It is yet a further object of the present invention to provide a cooling system as above which is less expensive than prior art systems.

It is yet a further object of the present invention to provide a cooling system as above which may be easily modified.

It is still a further object of the present invention to provide a cooling system as above which effectively eliminates the problem of scale.

The foregoing objects are attained by the fluid distribution system of the present invention.

In accordance with the present invention, a modular fluid distribution block is used which lends itself to a variety of configurations. The fluid distribution block comprises a multi-facet housing having at least three ports, preferably four ports, in fluid communication with each other. The fluid distribution block further comprises a plurality of feet about the periphery of the multi-facet housing, which feet have at least three orthogonally arranged bores machined therein. The bores in the feet allow the fluid distribution block to be mounted to another fluid distribution block, to have one or more of its ports closed off, and/or to have one or more of its ports connected to a flexible hose for providing a fluid medium such as a coolant to the cooling channels in the mold halves of a mold. The ability to use flexible hoses formed from non-metallic materials in a mold cooling system is particularly advantageous in eliminating problems such as scale and sweating.

As well as being used to provide coolant to the mold halves of an injection molding machine, the fluid distribution blocks of the present invention may also be used to form a return line for heated cooling fluid. The fluid distribution block if desired, may also be used for other service fluids.

Preferably, the fluid distribution blocks of the present invention are formed from a non-corrosive material such as 304 stainless steel which further helps to eliminate the problem of scale.

The modular cooling system using the fluid distribution blocks of the present invention have particular utility in a stack mold injection molding apparatus such as that shown in U.S. Pat. No. 4,408,981 and in a tandem injection molding apparatus such as that shown in U.S. Pat. No. 5,052,915, both of said patents being assigned to Husky Injection Molding Systems Ltd.

Other details of the fluid distribution blocks of the present invention and the manner in which they are employed in an injection molding machine are set forth in the following detailed description and the accompanying drawings in which like reference numerals depict like elements.

Other objects and advantages of the present invention are also set forth in the following detailed description.

DETAILED DESCRIPTION OF THE PREFERRED EMBODIMENT(S)

Figure 2:
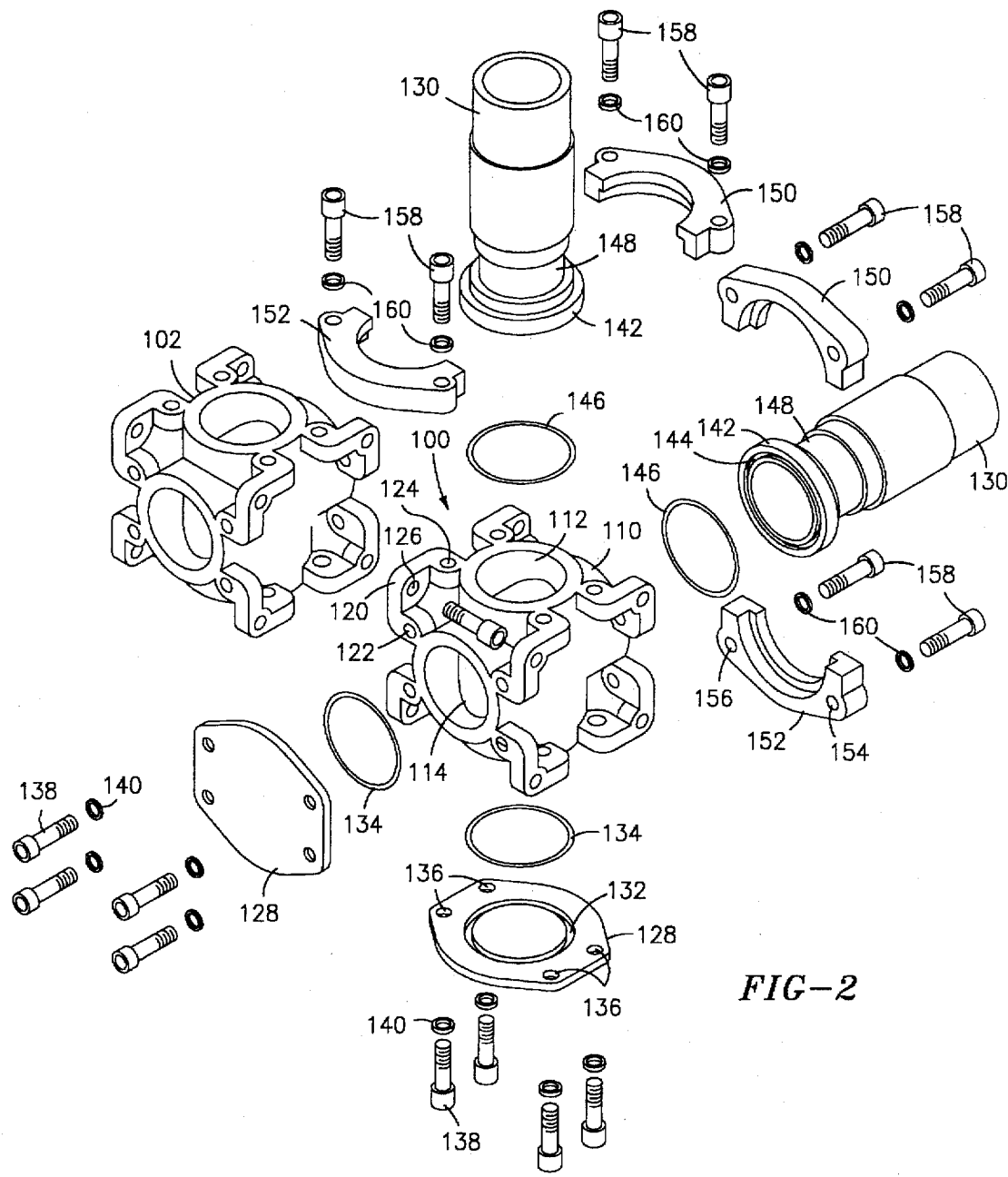
FIG. 2 is an exploded view of the novel fluid distribution block of the present invention.
Figure 3:
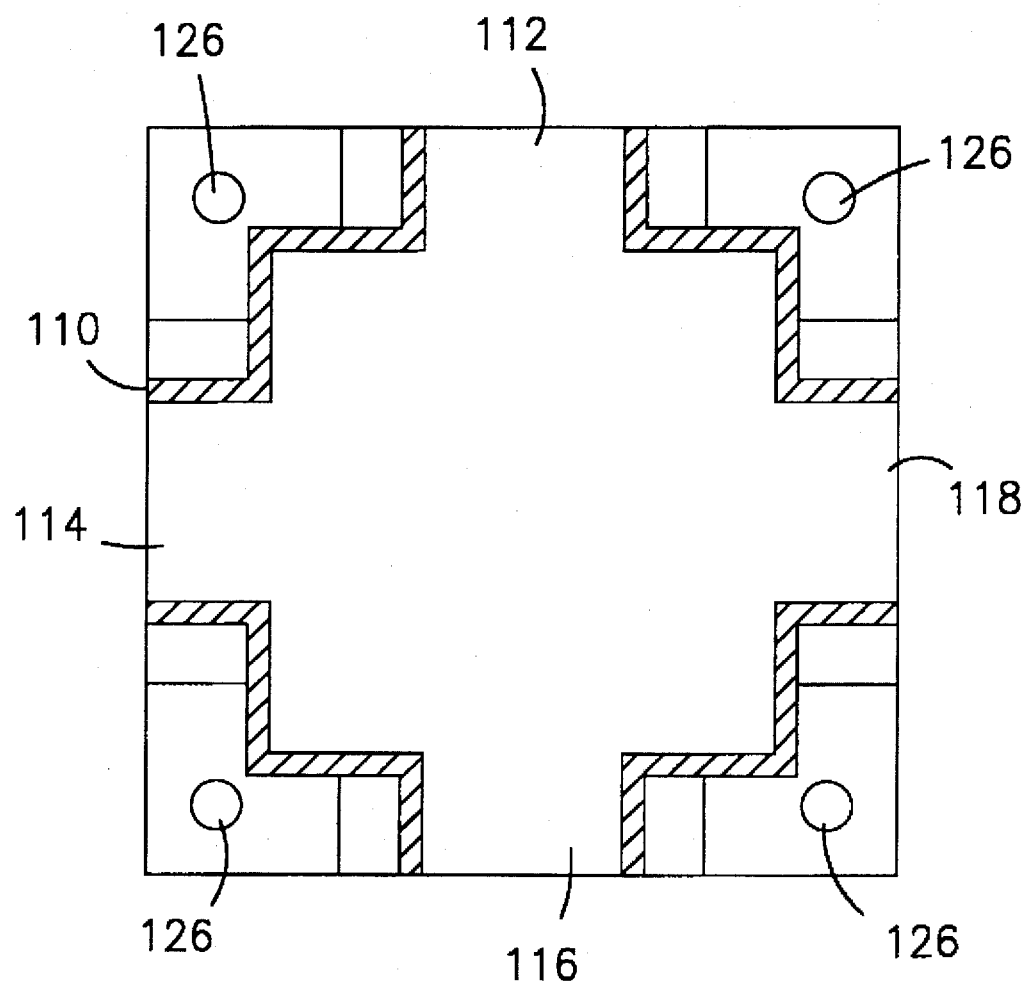
FIG. 3 is a sectional view of the novel fluid distribution block of the present invention.

Referring now to the drawings, FIGS. 2 and 3 illustrate the novel fluid distribution block 100 of the present invention. As shown therein, the fluid distribution block 100 comprises a multi-facet housing 110 having a plurality of ports 112, 114, 116 and 118. While the housing 110 may be provided with any number of ports, it is preferred that the housing have four ports. As can be seen from FIG. 3, the ports 112, 114, 116 and 118 are in fluid communication with each other.

The housing further has a plurality of feet 120, preferably eight feet, spaced about its periphery. Each of the feet 120 is provided with at least three orthogonally arranged bores 122, 124, and 126. The bores 122, 124, and 126 may be threaded or may be machined with or without a thread to accommodate a threaded insert. As will be discussed hereinafter, the bores 122, 124 and 126 allow the fluid distribution block 100 to be mounted to another fluid distribution block 102, to a plate 128 for closing a port, and/or to a fitting 130 for allowing the fluid distribution block to be connected to a flexible hose.

FIG. 2 illustrates two plates 128 for closing off ports in the fluid distribution block. As shown therein, the inner surface of the plate 128 has an annular groove 132 (such as for example a SAE 4 bolt flange) machined therein for receiving a sealing device 134 such as a rubber O-ring. Preferably, the groove 132 is sized so that its diameter is slightly larger than the diameter of the port which it is to close. Each plate 128 also has a plurality of bores 136 machined therein. To secure the plate into position, a plurality of threaded bolts 138 and washers 140 are utilized. The bolts are placed through the washers, through the bores 136 in the plate and into appropriate ones of the bores in a plurality of the feet. When secured in position, the plate 128 closes off the port and the sealing device 134 prevents the leakage of fluid between the housing 110 and the plate 128.

FIG. 2 also illustrates a fitting 130 which can be used with fluid distribution block 100 to join it to a flexible hose. As shown in FIG. 2, the fitting 130 has a first end 142 with an annular groove 144 machined therein. The annular groove 144 is sized to be slightly larger in diameter than the diameter of the ports in the fluid distribution block. A sealing device 146, such as a rubber O-ring, is seated within the groove 144. When the fitting 130 is joined to the fluid distribution block 100, the sealing device 146 will substantially prevent the leakage of fluid between the distribution block 100 and the fitting 130.

The fitting 130 also has an annular groove 148 machined into it adjacent the first end 142. As shown in FIG. 2, the annular groove 148 receives two split flange elements 150 and 152. Each of the split flange elements 150 and 152 has two bores 154 and 156 machined into it. To secure the fitting in place, the split flange elements 150 and 152 are seated in the groove 148. Thereafter, bolts 158 are passed through washers 160 into bores 154 and 156. The bolts 158 are then threaded into a plurality of bores in four of the feet.

If desired, the fluid distribution block 100 may be gang mounted to the fluid distribution block 102. This is accomplished by positioning the two distribution blocks 100 and 102 adjacent each other and passing a series of bolts through adjacent ones of the bores in the feet. As can be imagined, the fluid distribution blocks can be stacked together in any desired manner to facilitate the routing of a fluid flow and consolidation of connections.

To avoid the problem of scale, the housing 110 is formed from a corrosion resistant material such as 304 stainless steel.

Figure 4:
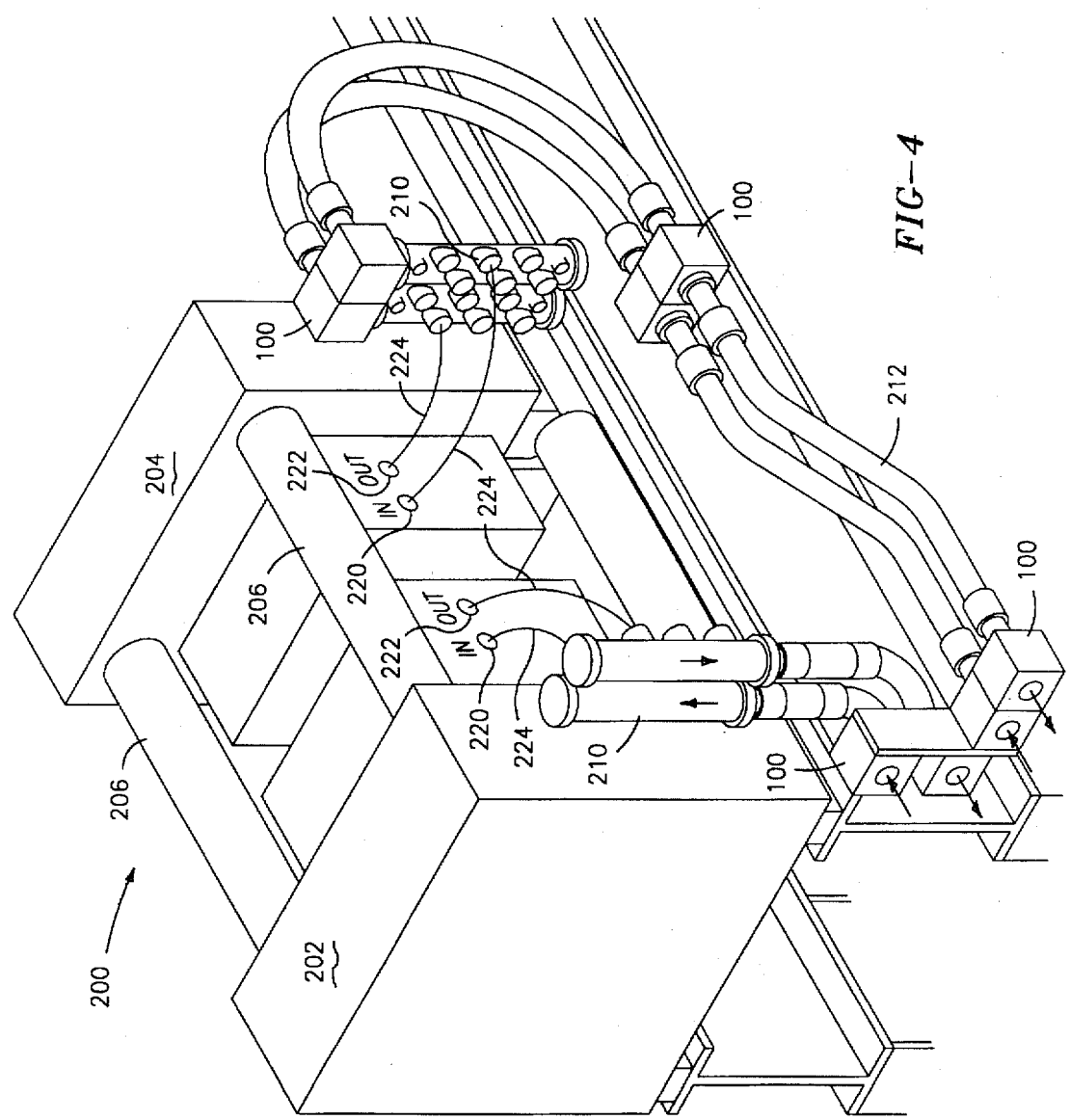
FIG. 4 illustrates an injection molding machine having a cooling system which utilizes a plurality of the fluid distribution blocks of the present invention.

Referring now to FIG. 4, an injection molding apparatus 200 is illustrated. The molding apparatus includes a stationary platen 202 to which a first mold half is connected and a movable platen 204 to which a second mold half is connected. Each of the mold halves 202 and 204 has a plurality of cooling channels (not shown) running therethrough. The movable platen 204 moves along tie bars 206 between a mold open position and a mold closed position. The means for moving the platen 204 between these positions does not form part of the present invention. Any suitable means known in the art may be used to move the platen 204 between the mold open and mold closed positions. Similarly, the means for providing the mold with a plastic material to be molded does not form part of the present invention. Here again, any suitable means known in the art may be used to provide the mold with molten plastic material for molding.

As previously discussed, it is important that a cooling medium such as water be provided to the mold halves 202 and 204 to remove the heat that occurs during molding and to cool the molded parts. To this end, the apparatus 200 is provided with a coolant distribution system. The coolant distribution system includes a number of fluid distribution blocks 100, certain ones of which are interconnected by flexible hoses 212. The fluid distribution blocks 100 each have a construction identical to that shown in FIGS. 2 and 3.

As shown in FIG. 4, some of the distribution blocks 100 act as fluid inlets while others acts as fluid outlets. Each of the fluid distribution blocks 100 communicates with a fluid manifold 210 which in turn communicates with one or more of the mold inlet ports 220 or one or more of the mold outlet ports 222 via hoses 224.

Figure 1A:
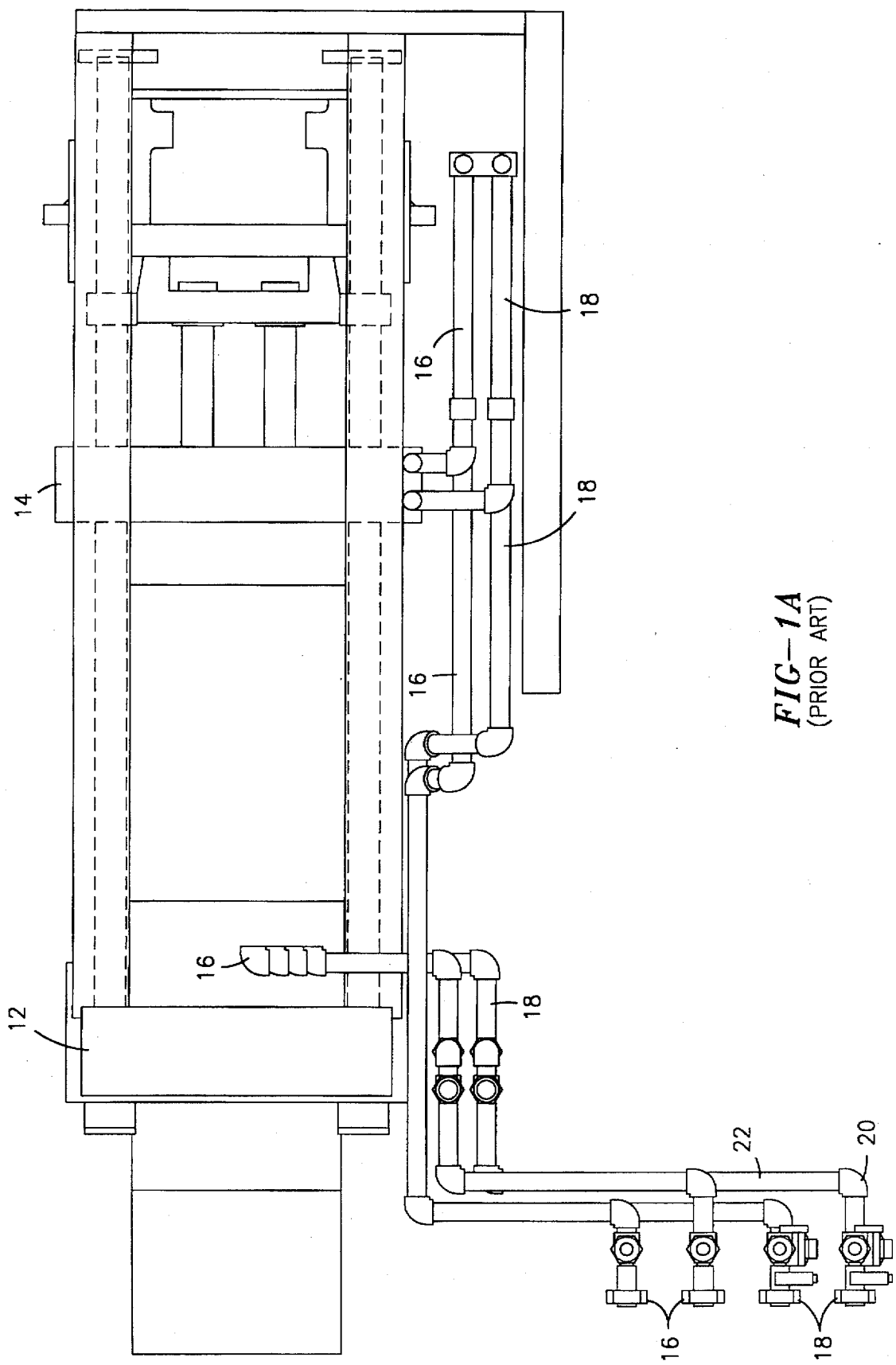
FIGS 1a and 1b illustrate a prior art system for providing cooling fluid to the mold halves of an injection molding machine.
Figure 1B:
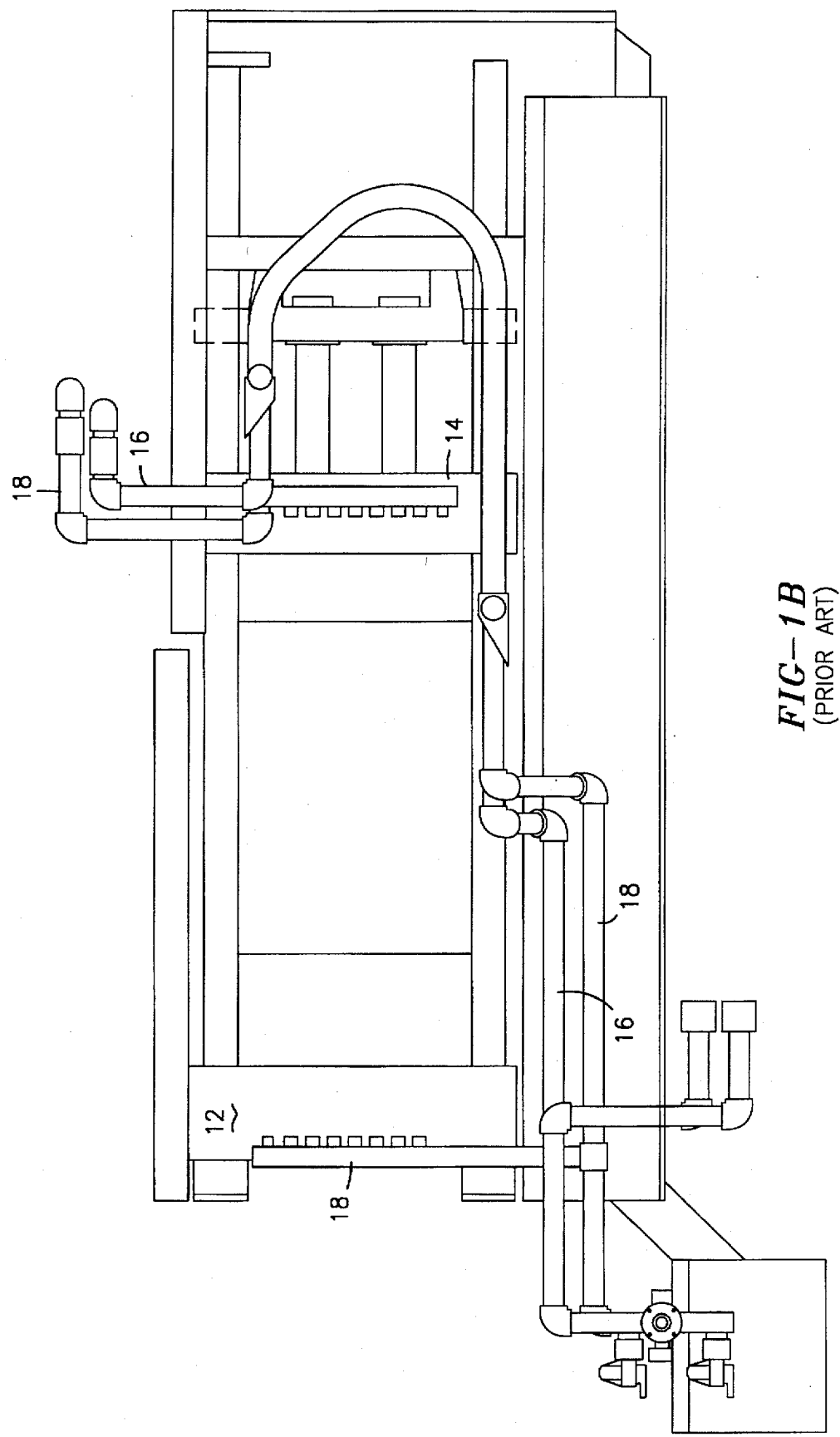

There are a number of advantages to the coolant distribution system shown in FIG. 4. First, the total number of connections in the system is reduced. Second, the hoses 212 that interconnect various ones of the distribution blocks 100 can be fabricated to an approximate length because their flexibility does not require any degree of precision. Additionally, assembly time for this system and the economic cost of the materials for the system are substantially less than those associated with the prior art system shown in FIG. 1.

Yet another advantage to the system of the present invention is that it is very easy to modify since only those components that require alteration need to be removed. Since the fluid distribution blocks 100 and hoses 212 are all non-corrosive, the problem of scale is effectively eliminated. Still further, the hose 212 which connects various ones of the fluid distribution blocks does not have to be painted or insulated as does steel pipe. Another advantage to the system of the present invention is the elimination of NPT threads and pipe fittings.

While the fluid distribution block of the present invention has been illustrated as having a particular cube-like shape, it should be recognized that it could be formed in other shapes if desired. Additionally, while it has been shown as having four ports, the fluid distribution block could have more than four ports if desired.

It is apparent that there has been provided in accordance with this invention a modular mold cooling system which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A fluid distribution block for use in a machine for making molded articles, said fluid distribution block comprising:

a multi-facet housing;

a fluid chamber within said housing;

at least three ports spaced about the periphery of said multi-facet housing, said ports being fluidically connected to said fluid chamber;

a first one of said ports being connected to at least one of a supply of fluid and a fluid drain;

a second one of said ports being fluidically connected with at least one cooling channel in a mold for making said molded articles; and said housing having means for connecting said distribution block to another structure, said connecting means being formed in an exterior portion of said housing.

2. The fluid distribution block of claim 1 further comprising:

means for closing a third one of said ports;

said closing means comprising a plate having a groove therein and means for preventing fluid leakage between said plate and said multi-facet housing seated within said groove; and means for joining said plate to said multi-facet housing so that said plate closes said third one of said ports.

3. The fluid distribution block of claim 1 further comprising:

means for connecting said second one of said ports to a hose;

said connecting means comprising a fitting having a first end which abuts said housing; and means for securing said fitting against said multi-facet housing.

4. The fluid distribution block of claim 3 further comprising:

said fitting having an annular groove adjacent said first end; and said securing means comprising a pair of split flanges which fit into said annular groove.

5. The fluid distribution block of claim 4 further comprising:

said connecting means comprising a plurality of bores;

each of said split flanges having a plurality of bores therein; and a plurality of connectors passing through said bores of each of said split flanges and being received by said bores in said multi-facet housing.

6. The fluid distribution block of claim 3 further comprising:

said fitting having an annular groove in said first end; and means for preventing fluid leakage between said fitting and said housing seated in said annular groove.

7. The fluid distribution block of claim 1 further comprising:

said multi-facet housing being formed from a non-corrosive material.

8. The fluid distribution block of claim 1 further comprising:

said multi-facet housing having four ports spaced about its periphery, said four ports being in fluid communication with each other via said fluid chamber; and said connecting means comprising a plurality of feet spaced about the exterior periphery of said housing, each of said feet having three orthogonally arranged bores.

9. The fluid distribution block of claim 1 further comprising:

a third one of said ports being in fluid communication with a port in another fluid distribution block.

10. A fluid distribution block comprising:

a housing;

a plurality of ports spaced about the periphery of said housing, said ports being in fluid communication with each other; and a plurality of feet spaced about the exterior periphery of said housing, each of said feet having at least three orthogonally arranged bores for allowing at least one of a closure plate, a fitting, and another distribution block to be mounted to said fluid distribution block.

11. The fluid distribution block of claim 10 further comprising:

a threaded hole positioned within at least one of said bores.

12. An injection molding machine comprising:

a stationary platen having a first mold half mounted thereto and a plurality of cooling channels therein;

a movable platen having a second mold half mounted thereto and a plurality of cooling channels therein;

means for distributing a cooling fluid to said cooling channels in said mold halves;

said distributing means comprising a first fluid distribution block;

said first fluid distribution block comprising a housing, a fluid chamber within said housing, and at least three ports spaced about the periphery of said housing;

each of said ports being fluidically connected to said fluid chamber;

a first one of said ports being fluidically connected to a source of said cooling fluid;

a second one of said ports being fluidically connected to said cooling channels in at least one of said stationary platen and said movable platen;

said first fluid distribution block further comprising connecting means spaced about said housing; and said first fluid distribution block being mounted to said machine via said connecting means.

13. The injection molding machine of claim 12 further comprising:

a second fluid distribution block mounted to said first fluid distribution block;

said second distribution block having a housing and a plurality of ports in fluid communication with each other;

a first one of said ports in said second distribution block being in communication with said cooling channels in at least one of said stationary platen and said movable platen for receiving heated fluid from said cooling channels; and a second one of said ports in said second distribution block being in communication with a drain sump into which said heated fluid is discharged.

14. The injection molding machine of claim 13 further comprising:

a third distribution block mounted to said movable platen, said third distribution block having a housing and a plurality of ports, said ports being in fluid communication with each other;

a first one of said ports in said third distribution block being in fluid communication with said cooling channels in said second mold half; and a second one of said ports in said third distribution block being in fluid communication with said second port of said first distribution block.

15. The injection molding machine of claim 14 further comprising:
   a fourth distribution block mounted to said moving platen;
   said fourth distribution block having a housing and a plurality of ports, said ports being in fluid communication with each other;
   a first one of said ports in said fourth distribution block being in fluid communication with said cooling channels in said second mold half for receiving said heated fluid; and
   a second one of said ports in said fourth distribution block being in fluid communication with said first one of said ports in said second fluid distribution block.

16. The injection molding machine of claim 13 further comprising:
   a fifth distribution block mounted to said stationary platen, said fifth distribution block having a housing and a plurality of ports in fluid communication with each other;
   a first one of said ports in said fifth distribution block being in fluid communication with said cooling channels in said first mold half; and
   a second one of said ports in said fifth distribution block being in fluid communication with said second one of said ports in said first fluid distribution block for receiving cooling fluid.

17. The injection molding machine of claim 13 further comprising:
   a sixth fluid distribution block mounted to said stationary platen, said sixth fluid distribution block having a plurality of ports in fluid communication with each other;
   a first one of said ports in said sixth fluid distribution block being in fluid communication with said cooling channels in said first mold half for receiving heated fluid from said cooling channels; and
   a second one of said ports in said sixth fluid distribution block being in fluid communication with said first one of said ports in said second fluid distribution block.

18. An injection molding apparatus including:
   means for molding plastic molten materials;
   means for fluid cooling said molding means;
   said fluid cooling means comprising a source of fluid, supply fluid means for introducing fluid into and removing fluid from said molding means, and a plurality of modular fluid distribution means connected to said supply fluid means; and
   each of said modular fluid distribution means comprising a housing, a fluid chamber within said housing, a plurality of ports spaced around said housing and being fluidically connected via said fluid chamber, and external means for connecting said housing to at least one of said molding means, another housing, and a support structure.

19. An injection molding apparatus according to claim 18, wherein the supply fluid means comprises fluid manifold means located externally of said molding means.

20. An injection molding apparatus according to claim 19 wherein said modular fluid distribution means are connected between said supply fluid means and said fluid manifold means.

* * * * *